United States Patent
Kwon et al.

(10) Patent No.: US 9,830,375 B2
(45) Date of Patent: Nov. 28, 2017

(54) APPARATUS FOR SELECTING AND PROVIDING MEDIA CONTENT ON SOCIAL NETWORK SERVICE AND METHOD THEREOF

(71) Applicant: KOREA INSTITUTE OF SCIENCE AND TECHNOLOGY, Seoul (KR)

(72) Inventors: Yong-Moo Kwon, Seoul (KR); Jaehyuk Park, Yongin-si (KR); Abbas Ali Butt, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 219 days.

(21) Appl. No.: 14/304,403

(22) Filed: Jun. 13, 2014

(65) Prior Publication Data

US 2015/0261843 A1    Sep. 17, 2015

(30) Foreign Application Priority Data

Mar. 13, 2014 (KR) .................. 10-2014-0029391

(51) Int. Cl.
*G06F 17/30* (2006.01)
*H04L 12/58* (2006.01)

(52) U.S. Cl.
CPC ........ *G06F 17/30595* (2013.01); *H04L 51/32* (2013.01)

(58) Field of Classification Search
CPC .......... G06F 17/3082; G06F 17/30867; G06F 17/30864; G06F 17/30595
USPC ....... 707/736, 722, 738, 754, 706, 723, 769, 707/689, 692, 708, 709, 710, 711, 726, 707/728, 739, 741, 748, 758, 802; 709/204, 224, 203, 206, 217, 219;
(Continued)

(56) References Cited

U.S. PATENT DOCUMENTS

| | | | |
|---|---|---|---|
| 8,122,371 B1* | 2/2012 | Keller ............... | G06Q 30/0203 715/764 |
| 2006/0173838 A1* | 8/2006 | Garg ..................... | G06Q 30/02 |

(Continued)

FOREIGN PATENT DOCUMENTS

| KR | 10-2007-0091834 A | 9/2007 |
|---|---|---|
| KR | 10-2010-0006752 A | 1/2010 |

(Continued)

OTHER PUBLICATIONS

Leung, Rosanna, Markus Schuckert, and Emmy Yeung. "Attractive User Social Media Engagement: A Study of Three Budget Airlines Facebook Pages." Information and Communication Technologies in Tourism 2013. Springer Berlin Heidelberg, 2013. pp. 195-206.

*Primary Examiner* — Jay Morrison
*Assistant Examiner* — Ken Hoang
(74) *Attorney, Agent, or Firm* — NSIP Law

(57) ABSTRACT

Disclosed is an apparatus and method for selecting and providing media content on a social network service (SNS), and the apparatus includes a media content search unit configured to search, from a SNS server which contains media content composed of images or text, for media content related to a user accessing the SNS server, a media content processing unit configured to determine at least one piece of media content among the retrieved media content as candidate media content by analyzing an image, text, or metadata of the retrieved media content, and a service providing unit configured to provide the determined candidate media content to the user.

18 Claims, 6 Drawing Sheets

(58) Field of Classification Search
USPC .... 725/32, 34, 106, 133, 18, 22, 28, 37, 45, 725/46, 48, 51, 53; 705/14.66, 14.31, 705/14.39, 14.41, 14.53, 14.57, 14.58, 705/14.61, 14.73, 26.7, 26.81, 347, 4, 705/7.14, 7.29
See application file for complete search history.

(56) References Cited

U.S. PATENT DOCUMENTS

| | | | | |
|---|---|---|---|---|
| 2008/0077570 | A1* | 3/2008 | Tang | G06F 17/30684 |
| 2009/0125934 | A1* | 5/2009 | Jones | H04N 7/163 |
| | | | | 725/28 |
| 2010/0287033 | A1* | 11/2010 | Mathur | G06F 17/30867 |
| | | | | 705/319 |
| 2012/0117167 | A1* | 5/2012 | Sadja | G06F 17/3089 |
| | | | | 709/206 |
| 2012/0164606 | A1 | 6/2012 | Moon et al. | |
| 2012/0173324 | A1* | 7/2012 | Vallery | G06Q 30/0631 |
| | | | | 705/14.25 |
| 2012/0197979 | A1* | 8/2012 | Palm | G06Q 30/0282 |
| | | | | 709/203 |
| 2012/0221563 | A1* | 8/2012 | De | G06Q 10/06311 |
| | | | | 707/728 |
| 2014/0025737 | A1* | 1/2014 | Kruglick | H04L 67/22 |
| | | | | 709/204 |
| 2014/0068459 | A1 | 3/2014 | Graham | |

FOREIGN PATENT DOCUMENTS

| | | |
|---|---|---|
| KR | 10-0954842 B1 | 4/2010 |
| KR | 10-2010-0052896 A | 5/2010 |
| KR | 10-2012-0072167 A | 7/2012 |
| KR | 10-2013-0089778 A | 8/2013 |
| KR | 10-2014-0015653 A | 2/2014 |

* cited by examiner

Candidate Media Content Group

Candidate Media Content Group

Vote

Multiple Users

Representative Media Content

APPARATUS FOR SELECTING AND PROVIDING MEDIA CONTENT ON SOCIAL NETWORK SERVICE AND METHOD THEREOF

CROSS-REFERENCE TO RELATED APPLICATION

This application claims priority to Korean Patent Application No. 10-2014-0029391, filed on Mar. 13, 2014, and all the benefits accruing therefrom under 35 U.S.C. §119, the contents of which in its entirety are herein incorporated by reference.

BACKGROUND

1. Field

The present disclosure relates to an apparatus and method for selecting media content, and particularly, to an apparatus and method for selecting media content using features of the media content on a social network service (SNS) and for providing the media content to a user.

2. Description of the Related Art

Recently, with the popularity of mobile devices, the use of social network services (SNSs) is dramatically growing. In this context, global social media network services and big data markets are getting bigger, and analysis services of social media network content are increasing. The content analysis service analyzes social responses to SNS content and creates some content based on the analysis result to be used in various fields, for example, social curation, social album, marketing based on social feature analysis of users, social advertising, big data analysis, and the like.

The global social media market approached 16.9 billion dollars as of 2012, and with an increasing number of social media users, it is expected that advertising markets will grow to form a market of 8.8 billion dollars and social game markets will form a market of 6.2 billion dollars.

Also, curation services are popular overseas, and particularly, image social curation Pinterest has been valued highly. A social curation service, as a key factor in promoting a new affordance to consumers, is applicable in services including various types of activities such as news, information collection, commerce, social media, and the like.

As described above, a SNS has become common. However, some pictures taken at the same place or at the same time period are uploaded to multiple SNS servers, and even in a single SNS, a large amount of media content including pictures or text is unorganized unless content is uploaded by categories.

Accordingly, a user has to do a tedious job of checking all media content one by one to search for media content having a specific theme or feature on a SNS or to determine content representing a lot of media content.

SUMMARY OF THE INVENTION

For the reasons stated above, it is required to select a small amount of representative media content among lots of media content distributed across various social network services (SNSs) or to select a portion of the media content based on predetermined criteria.

In one aspect, an apparatus for selecting and providing media content on a SNS according to an exemplary embodiment, including a media content search unit to search, from a SNS server which contains media content composed of images or text, for media content related to a user accessing the SNS server, a media content processing unit to determine at least one piece of media content among the retrieved media content as candidate media content by analyzing an image, text, or metadata of the retrieved media content, and a service providing unit to provide the determined candidate media content to the user is provided.

Also, the apparatus for selecting and providing media content on the SNS according to an exemplary embodiment may further include a communication interface unit to access the SNS server.

Also, in the apparatus for selecting and providing media content on the SNS according to an exemplary embodiment, the SNS server may include a plurality of SNS servers that provide different SNSs.

Also, in the apparatus for selecting and providing media content on the SNS according to an exemplary embodiment, the image may be a still image or a dynamic image.

Also, in the apparatus for selecting and providing media content on the SNS according to an exemplary embodiment, the media content related to the user may include media content posted on the SNS server by the user or a SNS friend of the user.

Also, in the apparatus for selecting and providing media content on the SNS according to an exemplary embodiment, the text may include a title of the media content, a body of the media content, or a comment for the media content.

Also, in the apparatus for selecting and providing media content on the SNS according to an exemplary embodiment, the metadata may include at least one of creation time information, edited time information, locational information and a file name, a file format, a number of likes, a number of shares of the media content, and information associated with a SNS friend who liked or shared the media content.

Also, in the apparatus for selecting and providing media content on the SNS according to an exemplary embodiment, the media content processing unit may calculate a representativeness point for each piece of media content by analyzing the text or the metadata of the retrieved media content, and may determine media content having a calculated representativeness point higher than or equal to a predetermined value as the candidate media content.

Also, in the apparatus for selecting and providing media content on the SNS according to an exemplary embodiment, the media content processing unit may calculate the representativeness point based on the number of times a predetermined keyword was used in the media content by analyzing a keyword included in the text of the media content.

Also, in the apparatus for selecting and providing media content on the SNS according to an exemplary embodiment, the media content processing unit may extract a keyword included in the text based on natural language processing and may analyze the keyword.

Also, in the apparatus for selecting and providing media content on the SNS according to an exemplary embodiment, the media content processing unit may calculate representativeness points for the media content using at least one of the number of likes, the number of shares, and the information associated with the SNS friend who liked or shared the media content, and may determine media content having a calculated representativeness point higher than or equal to a predetermined value as the candidate media content.

Also, in the apparatus for selecting and providing media content on the SNS according to an exemplary embodiment, the media content processing unit may group the candidate media content using a K-means clustering algorithm.

Also, in the apparatus for selecting and providing media content on the SNS according to an exemplary embodiment, the service providing unit may provide the candidate media content to the user through a web page.

Also, in the apparatus for selecting and providing media content on the SNS according to an exemplary embodiment, the service providing unit may provide multiple users with a voting service to select representative media content among the candidate media content.

Also, in the apparatus for selecting and providing media content on the SNS according to an exemplary embodiment, the service providing unit may select the representative media content by assigning different weights to voting rights by individual based on personal information of each of the multiple users.

In another aspect, a method for selecting and providing media content on a SNS according to an exemplary embodiment, including searching, from a SNS server which contains media content composed of images or text, for media content related to a user accessing the SNS server, determining at least one piece of media content among the retrieved media content as candidate media content by analyzing an image, text, or metadata of the retrieved media content, and providing the determined candidate media content to the user is provided.

Also, in the method for selecting and providing media content on the SNS according to an exemplary embodiment, the text may include a title of the media content, a body of the media content, or a comment for the media content, and the metadata may include at least one of creation time information, edited time information, locational information and a file name, a file format, the number of likes, the number of shares of the media content, and information associated with a SNS friend who liked or shared the media content.

Also, in the method for selecting and providing media content on the SNS according to an exemplary embodiment, the determining as the candidate group media content may include calculating a representativeness point for each piece of media content by analyzing the text or the metadata of the retrieved media content, and determining media content having a calculated representativeness point higher than or equal to a predetermined value as the candidate media content.

Also, in the method for selecting and providing media content on the SNS according to an exemplary embodiment, the determining of the candidate media content may include calculating representativeness points for the media content using at least one of the number of likes, the number of shares, and the information associated with the SNS friend who liked or shared the media content, and determining media content having a calculated representativeness point higher than or equal to a predetermined value as the candidate media content.

Also, the method for selecting and providing media content on the SNS according to an exemplary embodiment may further include grouping the candidate media content using a K-means clustering algorithm.

Also, in the method for selecting and providing media content on the SNS according to an exemplary embodiment, the providing of the determined candidate media content to the user may include providing the candidate media content to the user through a web page.

Also, the method for selecting and providing media content on the SNS according to an exemplary embodiment may further include providing multiple users with a voting service to select representative media content among the candidate media content.

Also, in the method for selecting and providing media content on the SNS according to an exemplary embodiment, the providing of the voting service may include selecting the representative media content by assigning different weights to voting rights by individual based on personal information of each of the different users.

An exemplary embodiment of the present invention may provide a user with selected candidate media content representing media content distributed across various SNS servers. In addition, when selecting the candidate media content, degree of interest or representativeness of the media content may be considered to select suitable media content as intended.

DETAILED DESCRIPTION OF THE INVENTION

Figure 1:
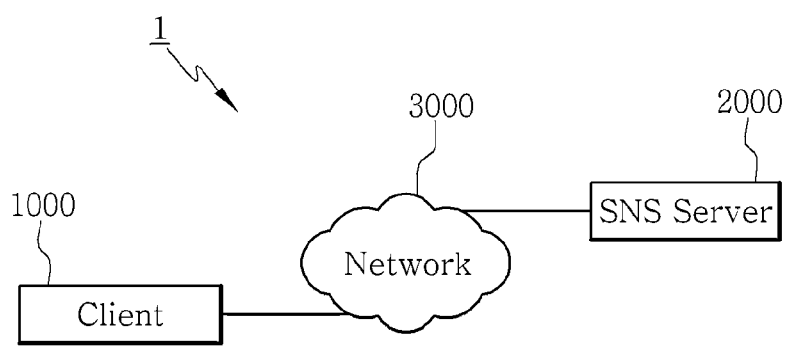
FIG. 1 is a block diagram illustrating a computer environment (1) in which an apparatus for selecting and providing media content on a social network service (SNS) according to an exemplary embodiment operates.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, it should be understood that the use of the terms "comprises" and/or "comprising", or "includes" and/or "including" when used in this specification, specify the presence of stated features, integers, steps, operations, elements, components, and/or groups thereof, but do not preclude the presence or addition of one or more other features, integers, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein. Like reference numerals presented in the drawings indicate like elements. However, in the description of exemplary embodiments, related known functions or constructions are not described in detail but omitted if they would obscure the general inventive concept with unnecessary detail. Also, in the drawings, the size of some of the elements may be exaggerated and not drawn on scale for illustrative purposes.

The embodiments described herein may take the form of entirely hardware, partially hardware and partially software, or entirely software. The term "unit", "module", "device" or "system" as used herein is intended to refer to a computer-related entity, either hardware, a combination of hardware and software, or software. For example, a unit, module, device or system as used herein can be, but is not limited to being, a process running on a processor, a processor, an object, an executable, a thread of execution, a program, and/or a computer. By way of illustration, both an application running on a computer and the computer can be a unit, module, device or system of the present disclosure.

The embodiments are described with reference to flowcharts presented in the drawings. For simplified description, the method is illustrated and described as a series of blocks, but the present disclosure is not limited to an order of the blocks, and some of the blocks may be placed with the other blocks in a different order from an order illustrated and described herein or may be concurrent with the other blocks, and a variety of different branches, flow paths, and block orders achieving a same or similar result may be implemented. Also, for implementation of the method described herein, all the blocks shown herein may not be required. Further, the method according an exemplary embodiment may be implemented in a form of a computer program for performing a series of processes, and the computer program may be recorded in a computer-readable recording medium.

Also, in the description of exemplary embodiments, related known functions or constructions are not described in detail but omitted if they would obscure the general inventive concept with unnecessary detail.

Hereinafter, exemplary embodiments of the present disclosure will be described in detail with reference to the drawings.

FIG. 1 is a block diagram illustrating a computer environment 1 in which an apparatus for selecting and providing media content on a social network service (SNS) according to an exemplary embodiment operates. As shown in FIG. 1, the computer environment 1 includes a client 1000 and a SNS server 2000 mutually connected to communicate via a network 3000. Only one entity is illustrated for each component for brief and clear description of embodiments. That is, in addition to the client 1000 and the SNS server 2000, other entities such as a web server and the like may also exist in the computer environment 1.

The SNS server 2000 is a hardware device and/or a software program. The SNS server 2000 is configured to provide a SNS to the client 1000 or other system. The SNS includes a service that stores, shares, and displays various types of media content posted (uploaded) to the SNS server 2000 by service users to provide other service users with the media content.

The SNS server 2000 may be communicatively coupled to the client 1000 to provide social metadata and media content to the client 1000. Also, the SNS server 2000 which is linked with the client 1000 according to another exemplary embodiment may include multiple servers. The SNS server 2000 may be one of an online community server, a SNS providing server, and a blog service providing server. For example, the SNS server 2000 may include FACEBOOK®, CYWORLD®, GOOGLE®, DAUM®, NAVER®, FLICKR®, TWITTER®, LINKNOW®, WEEBLY®, TODOLY®, RAINMAKER®, SEESMIC®, SLIDEROCKET®, LINKEDIN®, PINTEREST®, and the like. Also, in one embodiment, the SNS server 2000 may be, for example, a website of a friend on a SNS, a web page of a timeline or wall of FACEBOOK®, or the like.

The network 3000 may allow communication between the SNS server 2000 and the client 1000. In one embodiment, the network 3000 uses a standard communication technology/protocol. In other words, the network 3000 may include links using technologies such as Ethernet, 802.11, worldwide interoperability for microwave access (WiMAX), 2G/3G/4G, digital subscriber line (DSL), asynchronous transfer mode (ATM), infiniband, PCI Express Advanced Switching, and the like. Similarly, the networking protocol used on the network 3000 includes multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data transferred on the network 3000 may be represented using a technology and/or a format incorporating image data in a binary form (for example, Portable Network Graphics (PNG)), hypertext markup language (HTML), extensible markup language (XML), and the like. Additionally, all or a part of the links may be encrypted using existing encryption technologies such as secure sockets layer (SSL), transport layer security (TLS), virtual private networks (VPNs), Internet Protocol security (IPsec), and the like.

The client 1000 is a computer system, for example, a smart phone, a desk-top computer, a lap-top computer, a digital camera, any wearable digital device, a personal digital assistant (PDA), or a tablet PC. Hereinafter, the client 1000 is referred to as an apparatus for selecting and providing media content on a SNS according to an exemplary embodiment.

Figure 2:
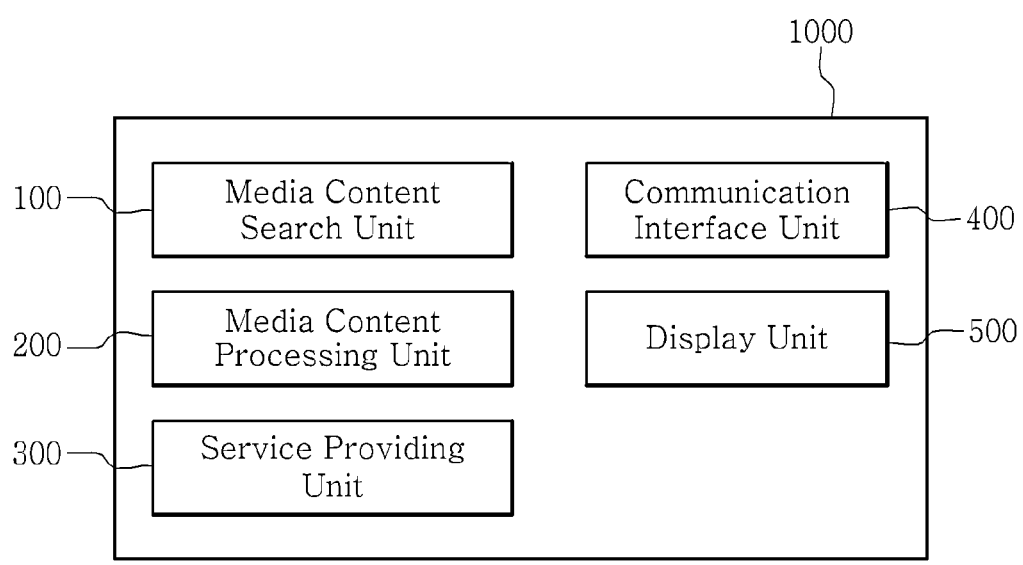
FIG. 2 is a block diagram illustrating an apparatus (1000) for selecting and providing media content on a SNS according to an exemplary embodiment.

FIG. 2 is a block diagram illustrating the apparatus 1000 for selecting and providing media content on a SNS according to an exemplary embodiment. Referring to FIG. 2, the apparatus 1000 for selecting and providing media content on a SNS may include a media content search unit 100, a media content processing unit 200, a service providing unit 300, a communication interface unit 400, and a display unit 500.

In one embodiment, the apparatus 1000 for selecting and providing media content on a SNS may further include a user input interface unit (not shown) to receive any user input from the user. The user input interface unit may receive the user input through any device such as a keyboard, a mouse, a touchscreen, a touchpad, a track ball, etc, and may provide the user input to the apparatus 1000 for selecting and providing media content on a SNS.

In one embodiment, the media content search unit 100 searches media content which contains media content composed of images or text from the SNS server 2000. Specifically, the media content search unit 100 searches the SNS server 2000 for media content related to a user accessing the SNS server.

Figure 3:
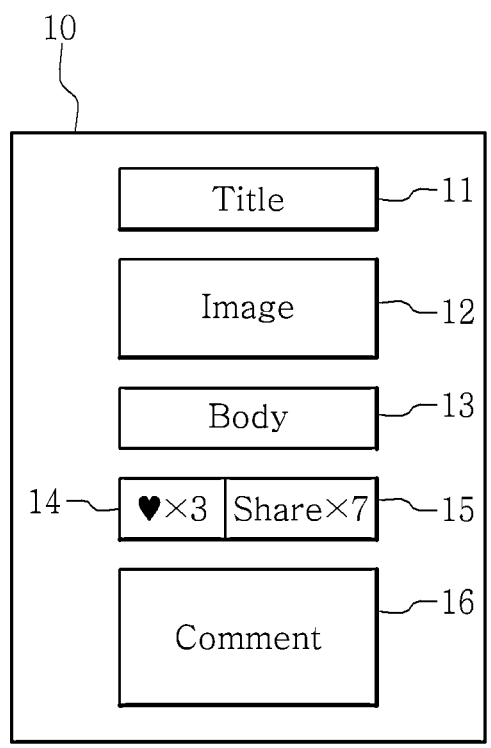
FIG. 3 is a diagram illustrating a simplified example of media content according to another exemplary embodiment.

FIG. 3 is a diagram illustrating a simplified example of media content according to another exemplary embodiment. The media content may be any posts on a SNS, consisting of either an image or text, or both an image and text. To the media content, comments or "shared" from users on SNSs may be added. Referring to FIG. 3, in one embodiment, the media content 10 may include at least one of a title 11, an image 12, a body 13, a symbol 14 for SNS users' preferences to the corresponding media content (for example, the "like" of Facebook), the number of times 15 the corresponding media content has been shared by other users, and a comment 16.

The media content search unit 100 may search for the media content related to the user accessing the SNS server 2000. The user may be a member who signed up for the service of the SNS server 2000. In one embodiment, the user may access the SNS server directly, and in another embodiment, the user may access the SNS server through a SNS service providing module. In said another embodiment, the user may access a plurality of SNS servers simultaneously. Accordingly, the media content search unit 100 may search various media content distributed over multiple SNS servers 2000.

Also, "the media content related to the user accessing the SNS server" may include media content posted (including, for example, uploaded or shared) to the SNS by the user, media content posted to the SNS by a SNS friend of the user, and media content posted by a friend of the SNS friend. The number of layers of the personal network may further increase.

The apparatus 1000 for selecting and providing media content on a SNS according to one embodiment may further include the communication interface unit 400 that accesses the SNS server 2000. Also, the SNS server 2000 may be composed of a plurality of SNS servers providing different SNSs.

In one embodiment, the media content processing unit 200 may determine at least one piece of media content among the retrieved media content as candidate media content by analyzing images, text, or metadata of the retrieved media content.

The metadata may include, but is not limited to, creation time information, edited time information, locational information and a file name of the media content, a file format, the number of likes, the number of shares, and information associated with a SNS friend who liked or shared the media content, and any information associated with the media content posted on the SNS may be included in the metadata.

In one embodiment, the media content processing unit 200 may calculate a representativeness point for each piece of media content using the text or the metadata of the retrieved media content, and thereby determine, the media content having a representativeness point higher than or equal to a predetermined value as the candidate media content.

Figure 4A:
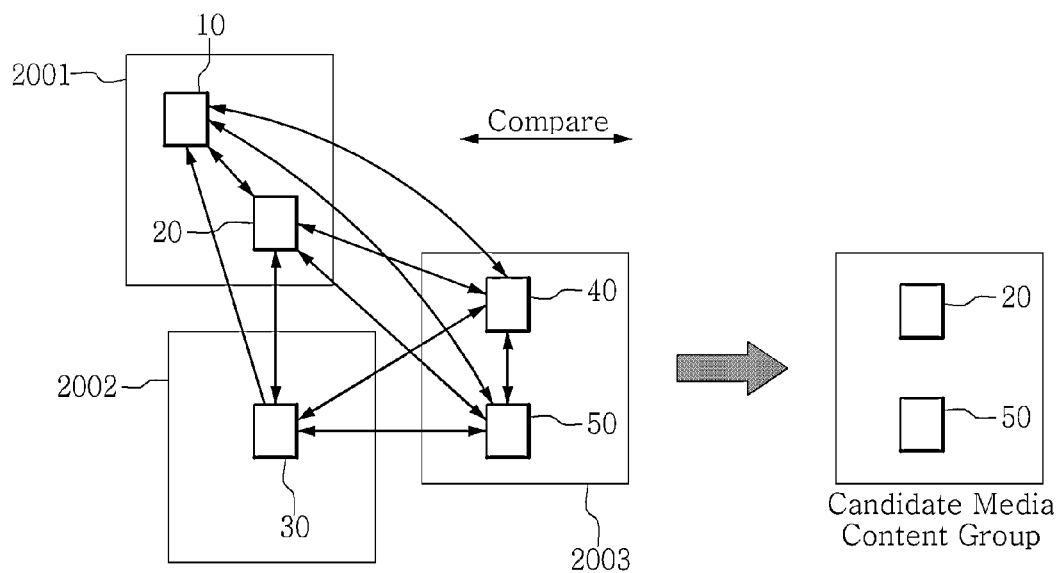
FIG. 4A is a block diagram illustrating a media content processing unit calculating the relevance between retrieved media content and determining candidate media content according to an exemplary embodiment.

FIG. 4A is a block diagram illustrating a media content processing unit calculating representativeness points of retrieved media content and determining candidate media content group according to an exemplary embodiment. Referring to FIG. 4A, for example, the media content processing unit 200 may calculate representativeness points by conducting a text analysis on a lot of retrieved media content 10-50, and may determine the media content 20, 50 having representativeness points higher than or equal to a predetermined value as candidate media content group. Here, the media content 10-50 may be distributed not in one SNS server but over various SNS servers 2001-2003. Specifically, the media content processing unit 200 may calculate a representativeness point for a piece of media content based on the number of times a predetermined keyword was used in the media content by analyzing a keyword included in the text of the media content. For example, in case the keyword "U.S.A." is determined as the most frequently used word over the whole media content, the media content processing unit 200 may calculate a representativeness point for each piece of media content based on an amount of the keyword "U.S.A." included the piece of media content. Accordingly, the more the keyword "U.S.A" is used in the piece of media content, the higher the representativeness point of the piece of media content gets. In one embodiment, a keyword may be a noun, but is not limited thereto, and the noun may be extracted through a natural language processing technology for word search. Using the aforementioned method, the media content processing unit 200 may conduct a qualitative analysis of media content.

In one embodiment, the media content processing unit 200 may extract a keyword included in text based on natural language processing to compare the text. Also, among various words in text, a keyword may be input as a query by a user, or a predetermined number of frequently used words among words in the text of media content may be determined as a keyword.

The media content processing unit 200 may select only a few pieces of media content from a huge amount of distributed media content based on the representativeness points of the media content. Referring to FIG. 4, the media content 20 and the media content 50 are determined as candidate media content group because representativeness points of the media content 20 and the media content 50 are higher than or equal to a threshold value, and the other media content 10, 30, and 40 are not determined as candidate media content because of their low representativeness points.

The representativeness point of a piece of media content may also be calculated based on degree of interest of a plurality of users in media content on a SNS, whereas the representativeness points described above are calculated by analyzing a keyword included in the media content. Also, a representativeness point may be calculated by analyzing the degree of interest and the keyword together.

A method of calculating a representativeness point in relation with the degree of interest is as follows.

The media content processing unit 200 may calculate a representativeness point of media content using at least one of the number of likes, the number of shares, and information associated with a SNS friend who liked or shared the media content, and may thereby determine media content having degree of interest higher than or equal to a predetermined value as candidate media content group.

In the above embodiment, the media content processing unit 200 may calculate the representativeness point using the following equations 1 through 3, but a method of calculating the representativeness point is not limited thereto, and the representativeness point may be calculated based on collected information and a method of promoting participation of a user provided by a SNS in many ways.

Representativeness point=the number of comments+ the number of users and SNS friends who left comments  [Equation 1]

Representativeness point=the number of comments+ the number of shares+the number of likes  [Equation 2]

Representativeness point=(0.5*the number of likes)+ the number of friends who left comments+ (2*the number of shares)  [Equation 3]

Based on the calculated representativeness point, the media content processing unit 200 may determine a candidate media content group in which users and friends of the users are interested. Also, in one embodiment, to calculate the representativeness point, the media content processing unit 200 may assign different weights to each item. For example, as shown in Equation 3, the degree of interest may be calculated by multiplying a weight of 0.5 for the number of likes and a weight of 1 for the number of friends who left comments. In another embodiment, the media content processing unit 200 may assign different weights based on the number of words in a comment or the number of friends who wrote comments.

Figure 4B:
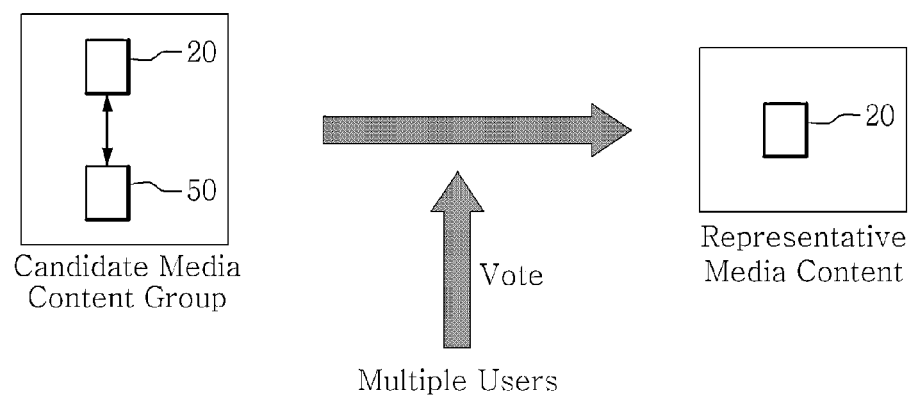
FIG. 4B is a diagram illustrating a voting system according to an exemplary embodiment.

FIG. 4B is a diagram illustrating a voting system according to an exemplary embodiment. Referring to FIG. 4B, the service providing unit may provide multiple users with a voting service for candidate media content, and may select representative media content based on voting results received from the multiple users. Accordingly, a huge amount of media content distributed across SNS servers is filtered primarily based on the information of the content (degree of interest of users or relevance between content). The result of the primary filtering is a candidate media content group. Also, secondary filtering is performed on the candidate media content group by the voting of users, and one or at least two pieces of final representative media content are left. The primary filtering may be a preprocessing step for performing the secondary filtering and the secondary filtering is in accordance with the intent of users directly. Referring to FIG. 4B, the media content 20 is selected as representative content.

In one example, in the secondary filtering, a user may have a voting right different from others based on the personal information of the user. The personal information may include the job of the user, an organization to which the user belongs, the relationship with an uploader, and the like. For example, a user who was at the place where media content was created when the media content was created may have a double or triple weight than other users.

Figure 5:
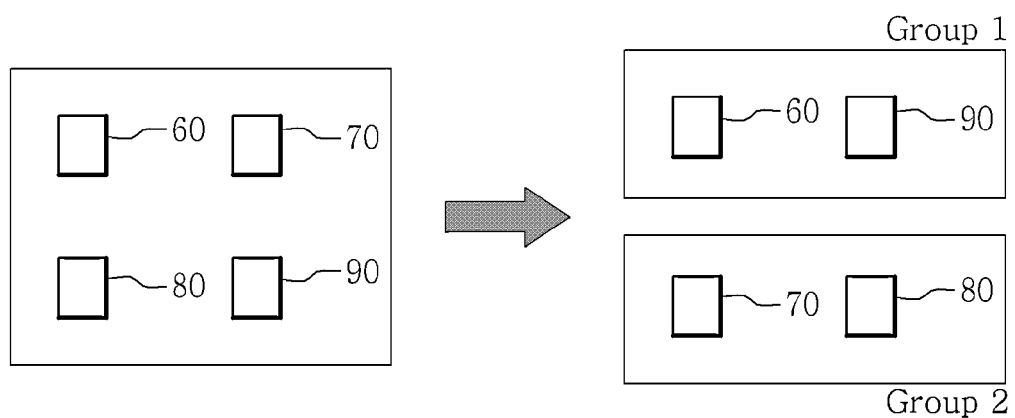
FIG. 5 is a diagram illustrating a media content processing unit (200) grouping candidate media content according to an exemplary embodiment.

FIG. 5 is a diagram illustrating the media content processing unit 200 grouping candidate media content according to an exemplary embodiment. The media content processing unit 200 may form a group composed of relevant candidate media content by grouping a large amount of candidate media content based on predetermined criteria. For example, the media content processing unit 200 may classify, into different groups, the media content 60-90 determined as candidates having relevance points or degrees of interest higher than or equal to a predetermined value. In FIG. 5, the candidate media content 60, 90 are grouped into Group 1, and the candidate media content 70, 80 are grouped into Group 2.

In one embodiment, the media content processing unit 200 may group the candidate media content using a K-means clustering algorithm. For example, the processing unit 200 may performs the grouping using the K-means clustering algorithm with time information or locational information of candidate media content, and a previously calculated relevance may be applied to the K-means clustering algorithm in the case of non-quantifiable information such as text.

In one embodiment, the service providing unit 300 may provide the user with the determined candidate media content through a web page. For example, when the apparatus 1000 for selecting and providing media content on a SNS is a server of an Internet service provider and the user uses a user terminal, the service providing unit 300 may provide the representative content to the user by configuring a web page to provide the user with representative content through a web browser of the user terminal.

In another embodiment, the apparatus 1000 for selecting and providing media content on a SNS may further include a display unit 500 as illustrated in FIG. 2. The display unit 500 may be any display device, and may be equipped with a touch screen using a plasma display panel (PDP), a liquid crystal display (LCD), a light-emitting diode (LED), an organic light-emitting diode (OLED), and the like, so that the display unit 500 may operate together with the user input interface unit.

Figure 6:
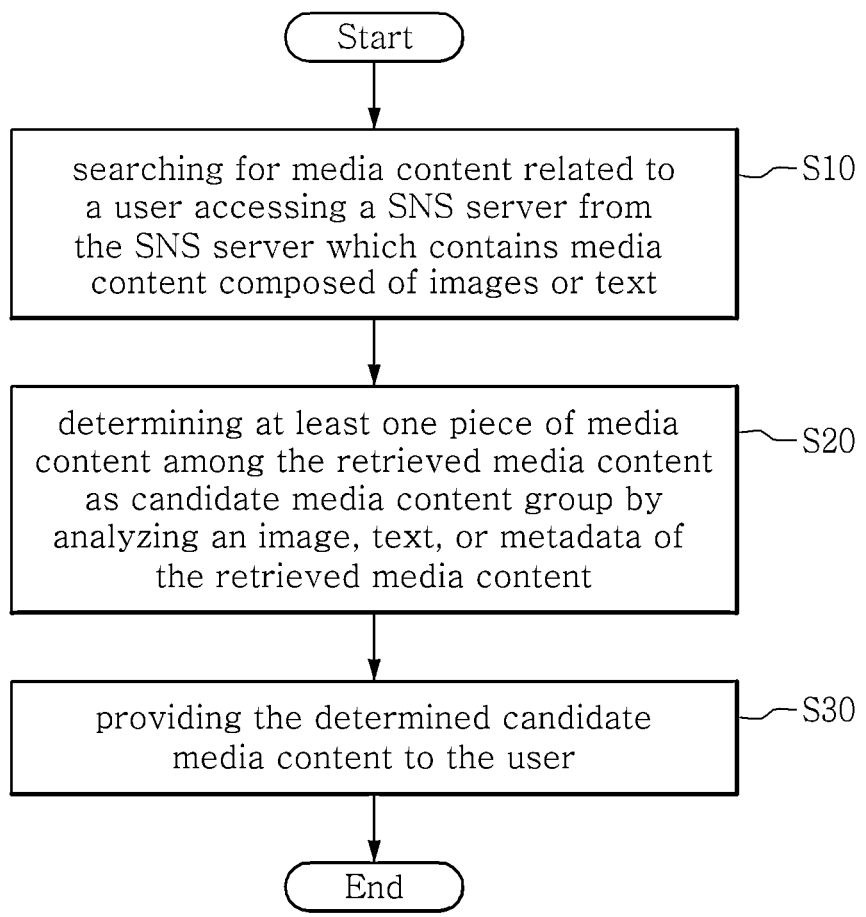
FIG. 6 is a flowchart illustrating a method for selecting and providing media content on a SNS according to an exemplary embodiment.

FIG. 6 is a flowchart illustrating a method for selecting and providing media content on a SNS according to an exemplary embodiment. Referring to FIG. 6, the method for selecting and providing media content on a SNS includes searching, from a SNS server which contains media content composed of images or text, for media content related to a user accessing the SNS server (S10), determining at least one piece of media content among the retrieved media content as candidate media content by analyzing the image, the text or the metadata of the retrieved media content (S20), and providing the determined media content to the user (S30).

In the method for selecting and providing media content on a SNS, text of media content may include the title, the body of the media content, or the comment written for the media content. Also, metadata of media content may include creation time information, edited time information, locational information and the file name, a file format, the number of likes, the number of shares of the media content, and information associated with a SNS friend who liked or shared the media content, but is not limited thereto.

Figure 7:
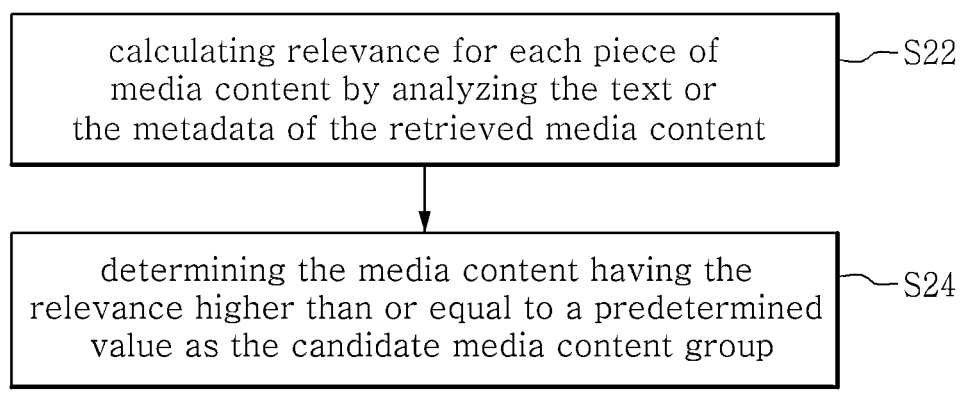
FIG. 7 is a detailed flowchart illustrating determining of the candidate media content (S20) according to another exemplary embodiment.

FIG. 7 is a detailed flowchart illustrating determining candidate media content group (S20) according to another exemplary embodiment. Referring to FIG. 7, the determining of the candidate media content group (S20) may include calculating a representativeness point for each piece of media content using text or metadata of the retrieved media content (S22), and determining media content having a calculated representativeness point higher than or equal to a predetermined value as candidate media content (S24). According to this embodiment, only specific media content may be selected based on representativeness points of distributed media content.

Figure 8:
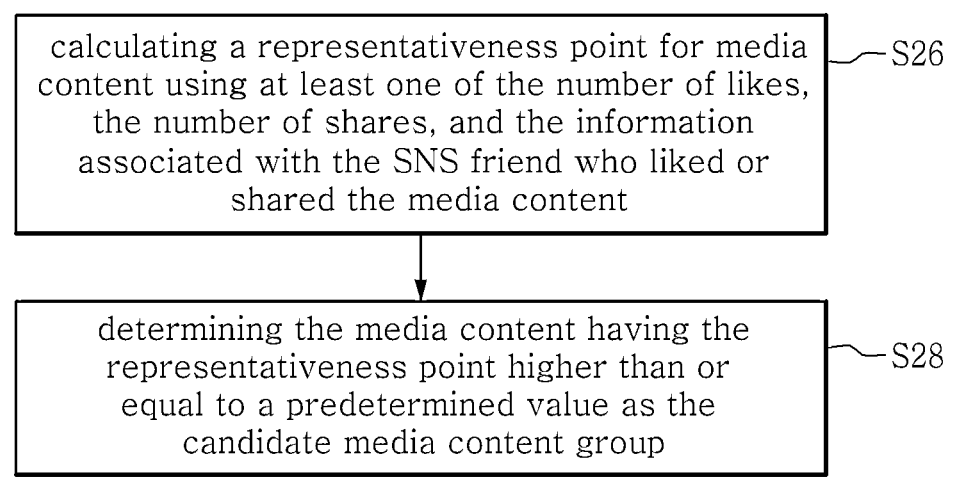
FIG. 8 is a detailed flowchart illustrating determining of the candidate media content (S20) according to another exemplary embodiment.

FIG. 8 is a detailed flowchart illustrating determining as candidate media content group (S20) according to still another exemplary embodiment. Referring to FIG. 8, the determining of the candidate media content group (S20) may include calculating representativeness points for media content using at least one of the number of likes, the number of shares, and information associated with a SNS friend who liked or shared the media content (S26), and determining media content having a calculated representativeness point higher than or equal to a predetermined value as candidate media content (S28). Thus, according to this embodiment, specific media content may be selected based on the degrees of interest of users and SNS friends of the users in media content.

Also, in another embodiment, the above operations of S22, S24, S26, and S28 may be performed in a sequential order. That is, in this embodiment, candidate media content group may be determined in consideration of relevance and the degree of interest together.

In one embodiment, the method for selecting and providing media content on a SNS may further include grouping the candidate media content using a K-means clustering algorithm. Also, the method for selecting and providing media content on a SNS may further include providing the candidate group media content to the user through a web page.

Also, the method may further include providing a voting service to multiple users to select representative media content among the candidate media content. Also, the step of providing the voting service may select the representative media content by assigning different weights to voting rights of different users based on personal information of each of the different users.

The foregoing-described methods for selecting and providing media content on a SNS may be implemented by the apparatus for selecting and providing media content on a SNS, and each operation may correspond to each element of the apparatus for selecting and providing media content on a SNS.

While the foregoing has been described with reference to the embodiments shown in the drawings, this is for illustration only, and it will be understood by those skilled in the art that various changes in form and details may be made thereto. However, such changes are construed as falling within the spirit and scope of the present disclosure. Therefore, the scope of the present disclosure shall be defined by the spirit of the appended claims.

What is claimed is:

1. An apparatus to select and provide media content on a social network service (SNS), the apparatus comprising:
    a media content searcher, implemented by a hardware-based processor, configured to search media content related to a user accessing an SNS server, wherein the media content comprises either one or both of an image and text;
    a media content processor, implemented by the hardware-based processor, configured to
        calculate a representativeness score for each piece of the media content as a weighted sum of any combination of any two or more of a number of likes, a number of shares, and information associated with a friend of the user on the SNS who liked or shared the media content, wherein weights of the weighted sum are based on a number of words in a comment and a number of friends who wrote comments,
        select the each piece of the media content having the representative score greater than or equal to a threshold, and
        group the selected each piece of the media content using a K-means clustering algorithm; and
    a service provider, implemented by the hardware-based processor, configured to provide the grouped selected each piece of the media content to the user.

2. The apparatus according to claim 1, further comprising a communication interface unit configured to access the SNS server.

3. The apparatus according to claim 1, wherein the SNS server comprises a plurality of SNS servers that provide different SNSs.

4. The apparatus according to claim 1, wherein the image is a still image or a dynamic image.

5. The apparatus according to claim 1, wherein the text comprises a title of the media content, a body of the media content, or a comment of the media content.

6. The apparatus according to claim 5, wherein the media content processor is further configured to determine the selected each piece of the media content using metadata comprising any one or any combination of creation time information, edited time information, locational information, a file name, a file format, the number of likes, the number of shares of the media content, and the information associated with the friend of the user on the SNS who liked or shared the media content.

7. The apparatus according to claim 6, wherein the media content processor is further configured to calculate the representativeness score by analyzing the text or the metadata.

8. The apparatus according to claim 7, wherein the media content processor is further configured to calculate the representativeness score based on a number of times that a keyword was used in the media content.

9. The apparatus according to claim 8, wherein the media content processor is further configured to extract the keyword based on natural language processing and to analyze the keyword.

10. The apparatus according to claim 1, wherein the service provider is further configured to provide the selected each piece of the media content to the user through a web page.

11. The apparatus according to claim 1 wherein the service provider is further configured to select the selected each piece of the media content by assigning weights to voting rights based on personal information of each of a plurality of users.

12. The apparatus according to claim 1, wherein the media content comprises content posted on the SNS server by the user or a friend of the user on the SNS.

13. A method to select and provide media content on a social network service (SNS), the method comprising:
    searching media content related to a user accessing an SNS server, wherein the media content comprises either one or both of an image and text;
    calculating a representativeness score for each piece of the media content as a weighted sum of any combination of any two or more of a number of likes, a number of shares, and information associated with a friend of the user on the SNS who liked or shared the media content, wherein weights of the weighted sum are based on a number of words in a comment and a number of friends who wrote comments;
    selecting the each piece of the media content having the representative score greater than or equal to a threshold;
    grouping the selected each piece of the media content using a K-means clustering algorithm; and
    providing the grouped selected each piece of the media content to the user.

14. The method according to claim 13, wherein the text comprises a title of the media content, a body of the media content, or a comment of the media content, and
    wherein the selecting the selected each piece of the media content further comprises selecting the selected each piece of the media content using metadata comprising at least one of creation time information, edited time information, locational information, a file name, a file format, the number of likes, the number of shares of the media content, or the information associated with the friend of the user on the SNS who liked or shared the media content.

15. The method according to claim 14, wherein the representative score is further determined by analyzing the text or the metadata of the media content.

16. The method according to claim 13, wherein the selected each piece of the media content is provided to the user through a web page.

17. The method according to claim 13, wherein the selected each piece of the media content is selected by assigning weights to voting rights based on personal information of each of a plurality of users.

18. The method according to claim 13, wherein the media content comprises content posted on the SNS server by the user or a friend of the user on the SNS.

* * * * *